Patented Feb. 23, 1937

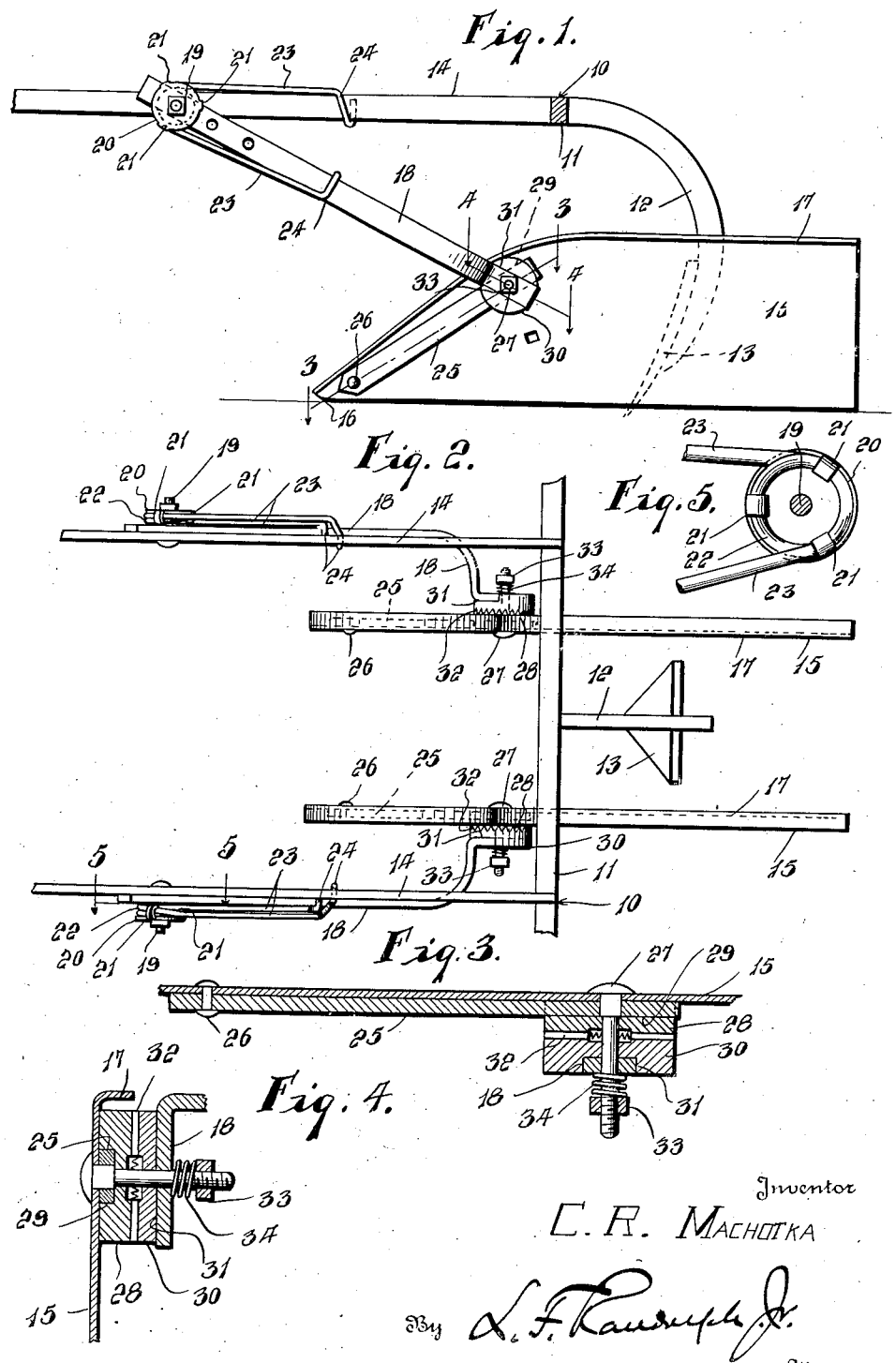

2,071,642

UNITED STATES PATENT OFFICE 2,071,642

CULTIVATOR SHIELD

Carl R. Machotka, Avoca, Wis.

Application May 5, 1936, Serial No. 78,023

3 Claims. (Cl. 97—188)

This invention relates to a shield for cultivators which is readily applicable to existing constructions so as to eliminate the covering of plants while being cultivated and which will lift the leaves of the plants, for instance corn, as the shield passes the same.

It is also aimed to provide a novel construction capable of maximum adjustment and one which will hold the shield yieldingly to the ground so as to be capable of momentarily yielding should it strike an obstruction.

It is further aimed to provide a structure having its point so formed that it will attach corn stalks and other waste matter and a construction wherein the adjustable parts are disposed in a position where the collection of dirt, trash and the like will not interfere or collect thereon.

The more specific objects and advantages will become apparent from a consideration of the description following taken in connection with accompanying drawing illustrating an operative embodiment.

In said drawing:

Figure 1 is a view showing my improvements in side elevation and as applied to a cultivator, the latter being shown fragmentarily;

Figure 2 is a plan view of the parts of Figure 1;

Figure 3 is a sectional view taken on the line 3—3 of Figure 1;

Figure 4 is a sectional view taken on the line 4—4 of Figure 1; and

Figure 5 is a detail section taken on the line 5—5 of Figure 2.

Referring specifically to the drawing wherein like reference characters designate like or corresponding parts throughout the different views, a conventional cultivating machine is shown at 10 in a fragmentary manner. Of such machine 11 is a rear cross-bar from which a beam 12 extends rearwardly and downwardly carrying a cultivator shovel 13 at the lower end. Forward side bars 14 extend from the rear cross-bar 11.

In accordance with the invention, a shield or plate 15 is disposed on each side of the cultivator shovel vertically and in parallelism in the line of draft. These shields at the front are preferably inclined downwardly and forwardly as shown and at their points are preferably rounded or made blunt as at 16 to avoid undue penetration into the soil and collection of trash and the like. The upper edge of the shields is preferably widened by means of a lateral flange 17.

Each shield 15 is supported by a bar 18. Such bars 18 are pivotally connected by means of bolts 19, transversely to the side elements 14. Such bolts 19 also secure in place metallic plates or disks 20 which have lugs 21 bent over and removably fastening coils 22 of springs thereto. Such springs have tines 23 provided with hooks 24 respectively engaging the bar 18 and the side member 14, the action of the spring being expansive so that the arms 23 tend to separate and thereby urge the shields 15 into contact with the ground.

In the event an obstruction is encountered during cultivation, the shields will move upwardly against the tension of the spring and will thereafter be restored into ground engaging position, avoiding breakage.

Adjacent the front edges of the shields, they are reinforced by cleats 25, secured in place in any suitable manner as by means of rivets 26 and removable bolts 27. Such bolts also pass through disks 28, which are recessed as at 29, so as to straddle or receive the adjacent cleat 25 and engage the shield. The bolts 27 also pass through disks 30 which are recessed or slotted as at 31 and removably receive the bar 18. It will be noted that the disks 28 and 30 have interengaging teeth as at 32 whereby they may be engaged at any desired angles, to adjustably secure the shields in the desired position. The bolts 27 also pass through the bars 18 and beyond the same the bolts 27 have nuts 33 screw-threaded thereon. Between the nuts 33 and bars 18, expansive springs 34 surround the bolts and abut such nuts and bars. As a result, the spring normally urges the parts into operative relation as shown in the drawing but permits the disk 30 and arm 18 to be moved outwardly and then turned, or other parts turned to secure the desired adjustment of the shields.

Various changes may be resorted to provided they fall within the spirit and scope of the invention.

I claim as my invention:—

1. In combination with a cultivator having a frame and cultivating shovel, a shield disposed at one side of the shovel, an arm mounting said shield, and means pivotally connecting the arm to the frame and resiliently urging the arm downwardly to maintain the shield in contact with the ground, the last mentioned means comprising a bolt, a plate strung on said bolt, a spring having coils and arms connected to the frame and to the bar, and said plate having lugs bent over said coils.

2. A device of the class described in combination with a cultivator frame and a cultivator shovel, a shield adjacent said shovel, a bar extending from the frame, a disk disposed against the shield, a second disk, inter-engaging teeth between said disks, the last mentioned disk having a groove in which said arm is disposed, a bolt passing through the shield, disks and arms, a nut on said bolt, and an expansive spring on said bolt engaging the nut and said bar.

3. A device of the class described in combination with a cultivator frame and a cultivator shovel, a shield adjacent said shovel, a bar extending from the frame, a disk disposed against the shield, a second disk, inter-engaging teeth between said disks, the last mentioned disk having a groove in which said arm is disposed, a bolt passing through the shield, disks and arms, a nut on said bolt, and an expansive spring on said bolt engaging the nut and said bar, and a cleat secured to the shield through which the bolt also passes, the first mentioned disk straddling said cleat.

CARL R. MACHOTKA.